(12) United States Patent
Bacon et al.

(10) Patent No.: US 8,993,153 B2
(45) Date of Patent: Mar. 31, 2015

(54) RAMPED BATTERY CONTACT SYSTEMS AND METHODS

(75) Inventors: Charles Bacon, Brooklyn, NY (US); Edward Voli, East Setauket, NY (US)

(73) Assignee: Symbol Technologies, Inc., Holtsville, NY (US)

(*) Notice: Subject to any disclaimer, the term of this patent is extended or adjusted under 35 U.S.C. 154(b) by 1067 days.

(21) Appl. No.: 12/541,292

(22) Filed: Aug. 14, 2009

(65) Prior Publication Data

US 2011/0039143 A1  Feb. 17, 2011

(51) Int. Cl.
H01M 2/02 (2006.01)
H01M 2/10 (2006.01)
H01M 10/00 (2006.01)
H01M 2/30 (2006.01)
H01R 31/06 (2006.01)

(52) U.S. Cl.
CPC ............... *H01M 2/30* (2013.01); *H01R 31/06* (2013.01); *H01M 2/1022* (2013.01)
USPC ........... 429/179; 429/178; 429/121; 429/123; 439/500; 439/786; 439/866

(58) Field of Classification Search
None
See application file for complete search history.

(56) References Cited

U.S. PATENT DOCUMENTS

| 6,068,519 A * | 5/2000 | Lok ................................ 439/660 |
| 7,381,086 B1 | 6/2008 | Gilmore et al. |
| 2002/0106932 A1 | 8/2002 | Holland et al. |

FOREIGN PATENT DOCUMENTS

| EP | 0617486 | 9/1994 |
| EP | 1965469 | 9/2008 |

OTHER PUBLICATIONS

International Search Report and Written Opinion dated Nov. 4, 2010 in related case PCT/US2010/045242.
International Preliminary Report on Patentability and Written Opinion for International Application No. PCT/US2010/045242 mailed on Feb. 23, 2012.

* cited by examiner

*Primary Examiner* — Krishnan S Menon

(57) ABSTRACT

The present disclosure relates to ramped battery contacts for a battery pack that support multiple engagement methods to devices, such as terminals, recharging stations, and the like. The battery pack can make a connection with a terminal one way and with a recharging station with another. Advantageously, the multiple engagement methods allow for different connectors for the different applications associated with the terminal and the recharging station. In an exemplary embodiment, the ramped battery contacts enable a terminal to connect to a battery pack through pogo-pin contacts to prevent disconnections in a rugged environment. The same ramped battery contacts can connect to a recharging station with leaf spring contacts through a swiping action that makes insertion and removal of the battery pack in the recharger quicker and easier.

8 Claims, 4 Drawing Sheets

RAMPED BATTERY CONTACT SYSTEMS AND METHODS

FIELD OF THE INVENTION

The present invention relates generally to batteries. More particularly, the present invention relates to ramped battery contact systems and methods for rechargeable battery packs whereby the battery packs support multiple connection modes to terminals, recharging devices, and the like through ramped battery contacts on the battery packs.

BACKGROUND OF THE INVENTION

Battery usage in various devices has proliferated with advancements in rechargeable battery technology, e.g. lithium-ion batteries and the like. Advantageously, advancements in battery technologies has provided for a widespread adoption of "unplugged" devices that can operate without requiring cabling to a power source. Rechargeable batteries are utilized in any number of devices such as mobile phones, laptop computers, bar code scanning devices, radio frequency identification (RFID) devices, smart phones and other personal digital assistant (PDA) devices, two-way radios and pagers, wireless local area network (WLAN) devices, and the like. These devices can be generally referred to as mobile devices or terminals. Generally, the battery can be removable and replaceable in a mobile device. For example, the battery can be removed from a mobile device and placed in a charging station for recharging. Afterward, the battery can be removed from the charging station and reinserted in the mobile device.

Battery contacts are an important consideration in the design of battery packs. As described herein, a battery pack includes a battery housing, battery contacts, and battery cells disposed within the battery housing and coupled to the battery contacts. For example, the battery cells can be a rechargeable battery including several "dry cell" types, which are sealed units and are therefore useful in mobile devices such as mobile phones and laptop computers. Exemplary battery cells can include nickel-cadmium (NiCd), nickel metal hydride (NiMH), and lithium-ion (Li-ion) cells.

With respect to mobile devices and the associated recharging station for a battery pack, the battery contacts must be designed to properly engage both the device (also referred to as the terminal) and the recharging station. Thus, battery contact design is an important aspect of battery pack design. A problem can arise whereby the battery pack requires different connection modes for the terminal and the recharging station. There are often conflicting design requirements such as connections to the terminal can require a durable and rugged design whereas connections to the recharging station can require ease of use. For example, a battery pack can slide perpendicular to engage one device and parallel to engage to another device.

BRIEF SUMMARY OF THE INVENTION

In various exemplary embodiments, the present invention relates to ramped battery contacts for a battery pack that support multiple engagement methods to devices, such as terminals, recharging stations, and the like. The battery pack can make a connection with a terminal one way and with a recharging station with another. Advantageously, the multiple engagement methods allow for different connectors for the different applications associated with the terminal and the recharging station. In an exemplary embodiment, the ramped battery contacts enable a terminal to connect to a battery pack through pogo-pin contacts to prevent disconnections in a rugged environment. The same ramped battery contacts can connect to a recharging station with leaf spring contacts through a swiping action that makes insertion and removal of the battery pack in the recharger quicker and easier. The battery pack can be utilized in any application where the battery pack is removed from its associated terminal device for recharging.

In an exemplary embodiment of the present invention, a battery with ramped battery contacts includes a housing; battery contacts disposed on the housing, wherein the battery contacts include a ramped configuration of a plurality of contacts and a contact pad, and wherein the ramped configuration supports multiple connection modes between the battery and one or more devices. The ramped configuration include a bottom plane, a top plane, and a ramp plane interconnecting the bottom plane and the top plane, wherein the ramp plane is at an angle relative to the bottom plane and the top plane, and wherein the bottom plane and the top plane are substantially parallel. The plurality of contacts and the contact pad extend along each of the bottom plane, the top plane, and the ramp plane. The plurality of contacts is slightly recessed relative to the contact pad. The ramped configuration supports connection to a device with pogo pin contacts in a first mode and connection to a device with leaf spring contacts in a second mode. The device with pogo pin contacts includes a terminal device configured to attach and detach with the battery, and the device with leaf spring contacts includes a charger configured to attach and detach with the battery. The pogo pin contacts are slid into the ramped configuration substantially perpendicular to the bottom plane, the top plane, and the ramp plane such that the bottom plane, the top plane, and the ramp plane form a landing pad providing different compression actions to the pogo pin contacts; and the leaf spring contacts are swiped into the bottom plane, the top plane, and the ramp plane substantially parallel to the bottom plane, the top plane, and the ramp plane such that the leaf spring contacts first engage from the bottom plane to the ramp plane to the top plane. The plurality of contacts is slightly recessed relative to the contact pad, and wherein the leaf spring contacts engage the bottom plane, the top plane, and the ramp plane without damaging the housing. The multiple connection modes include a perpendicular connection mode and a parallel connection mode, wherein in the perpendicular connection mode a device of the one or more devices engages the ramped configuration from a substantially perpendicular direction relative to the ramped configuration, and wherein in the parallel connection mode a device of the one or more device engages the ramped configure from a substantially parallel direction relative to the ramped configuration.

In another exemplary embodiment of the present invention, a system supporting multiple battery connection modes includes a battery pack including battery contacts, wherein the battery contacts include a ramped configuration of a plurality of contacts and a contact pad; a first device including pogo pin contacts; and a second device including leaf spring contacts; wherein the ramped configuration provides different connection modes between the battery and the first device and between the battery and the second device. The ramped configuration includes a bottom plane, a top plane, and a ramp plane interconnecting the bottom plane and the top plane, wherein the ramp plane is at an angle relative to the bottom plane and the top plane, and wherein the bottom plane and the top plane are substantially parallel. The plurality of contacts and the contact pad extend along each of the bottom plane, the top plane, and the ramp plane. The plurality of contacts is slightly recessed relative to the contact pad. The first device includes a terminal device configured to attach and detach with the battery, and the second device includes a charger configured to attach and detach with the battery. The pogo pin contacts are slid into the ramped configuration substantially perpendicular to the bottom plane, the top plane, and the ramp plane such that the bottom plane, the top plane, and the ramp plane form a landing pad providing different compression actions to the pogo pin contacts; and wherein the leaf spring contacts are swiped into the bottom plane, the top plane, and the ramp plane substantially parallel to the bottom plane, the top plane, and the ramp plane such that the leaf spring contacts first engage from the bottom plane to the ramp plane to the top plane. The plurality of contacts are slightly recessed relative to the contact pad, and wherein the leaf spring contacts engage the bottom plane, the top plane, and the ramp plane without damaging the battery pack. The different connection modes include a perpendicular connection mode and a parallel connection mode, wherein in the perpendicular connection mode the first device engages the ramped configuration from a substantially perpendicular direction relative to the ramped configuration, and wherein in the parallel connection mode the second device engages the ramped configure from a substantially parallel direction relative to the ramped configuration.

In yet another exemplary embodiment of the present invention, a method of connecting a detachable battery to two different devices includes connecting the detachable battery to a first device by sliding the detachable battery onto the first device, wherein battery contacts on the detachable battery includes a ramped configuration of a plurality of contacts and a contact pad; disconnecting the detachable battery from the first device; and connecting the detachable battery to a second device by swiping the detachable battery onto the second device; wherein the ramped configuration enables the detachable battery to connect differently to each of the first device and the second device. The ramped configuration includes a bottom plane, a top plane, and a ramp plane interconnecting the bottom plane and the top plane, wherein the ramp plane is at an angle relative to the bottom plane and the top plane, and wherein the bottom plane and the top plane are substantially parallel; and wherein the ramped configuration supports connection to the first device including pogo pin contacts and connection to the second device including leaf spring contacts. The pogo pin contacts are slid into the ramped configuration substantially perpendicular to the bottom plane, the top plane, and the ramp plane such that the bottom plane, the top plane, and the ramp plane form a landing pad providing different compression actions to the pogo pin contacts; and wherein the leaf spring contacts are swiped into the bottom plane, the top plane, and the ramp plane substantially parallel to the bottom plane, the top plane, and the ramp plane such that the leaf spring contacts first engage from the bottom plane to the ramp plane to the top plane.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In various exemplary embodiments, the present invention relates to ramped battery contacts for a battery pack that support multiple engagement methods to devices, such as terminals, recharging stations, and the like. The battery pack can make a connection with a terminal one way and with a recharging station with another. Advantageously, the multiple engagement methods allow for different connectors for the different applications associated with the terminal and the recharging station. In an exemplary embodiment, the ramped battery contacts enable a terminal to connect to a battery pack through pogo-pin contacts to prevent disconnections in a rugged environment. The same ramped battery contacts can connect to a recharging station with leaf spring contacts through a swiping action that makes insertion and removal of the battery pack in the recharger quicker and easier. The battery pack can be utilized in any application where the battery pack is removed from its associated terminal device for recharging.

Figure 1:
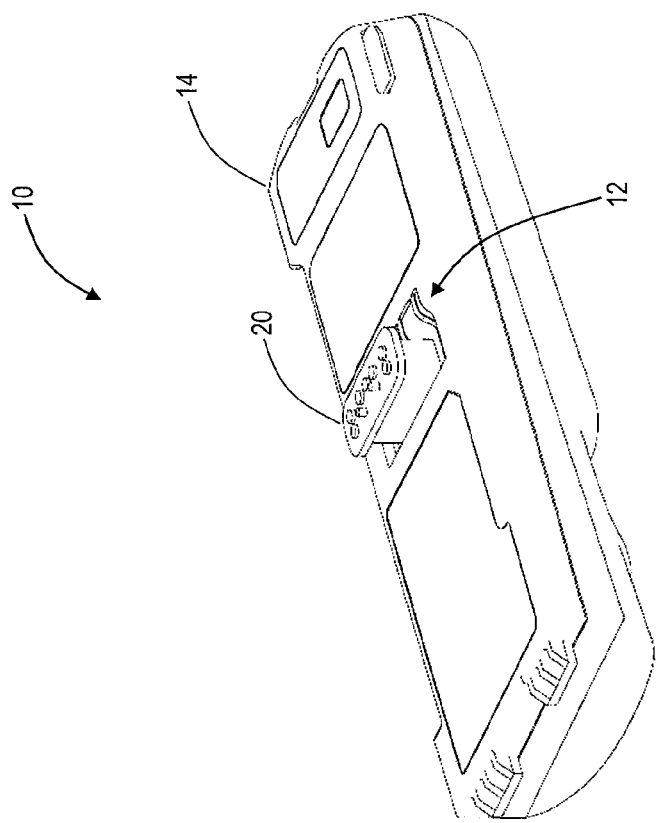
FIG. 1 illustrates a battery pack with ramped battery contacts detached from a connection pad in a first mode of connection according to an exemplary embodiment of the present invention.
Figure 2:
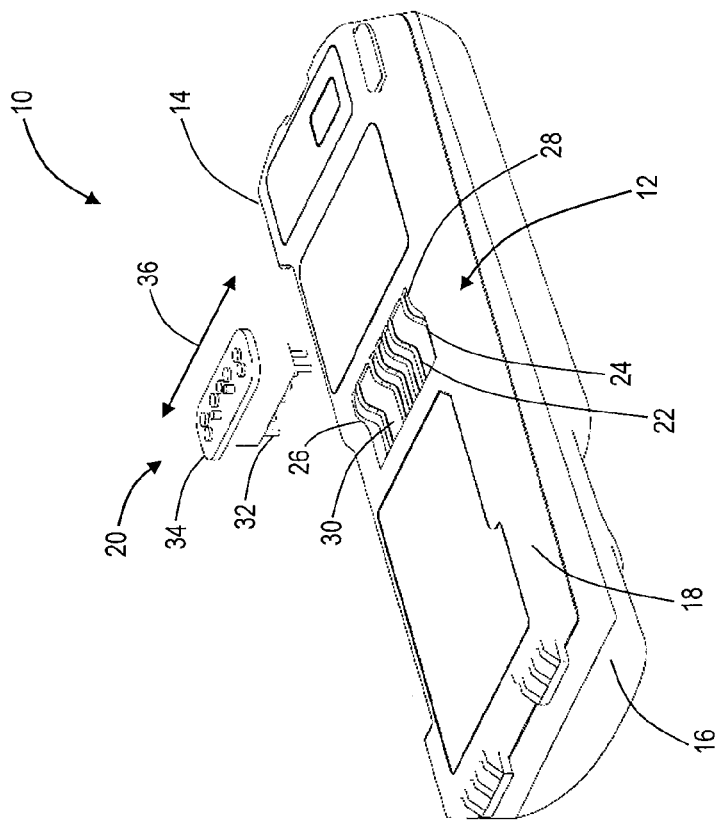
FIG. 2 illustrates the battery pack attached to the connection pad of FIG. 1 according to an exemplary embodiment of the present invention.

Referring to FIGS. 1 and 2, a battery pack 10 with ramped battery contacts 12 is illustrated in a first mode of connection according to an exemplary embodiment of the present invention. The battery pack 10 is a removable battery that can be attached to a terminal device for powering the terminal device. Correspondingly, the battery pack 10 is detachable from the terminal device for repowering in a recharging station. The battery pack 10 includes a battery housing 14, the battery ramped contacts 12, and battery cells (not shown) disposed within the battery housing 14 and coupled to the battery ramped contacts 12. The battery housing 14 includes a shape and various connectors that enable the battery housing 14 to removably attach/detach from the terminal device. In this exemplary embodiment, the battery housing 14 includes two half portions 16, 18 that collectively form the battery housing 14. These half portions 16, 18 can open to allow access to the battery housing 14 interior and the associated battery cells and other components inside the battery pack 10.

FIG. 1 illustrates the battery pack 10 with the ramped battery contacts 12 detached from a connection pad 20 in a first mode of connection according to an exemplary embodiment of the present invention. The ramped battery contacts 12 include a plurality of contacts 22 in a ramped configuration disposed on, at, and/or slightly above/below a surface of the battery housing 14. Each of the plurality of contacts 22 extend from outside the battery housing 14 to an interior portion of the battery housing 14 where they connect to one or more battery cells. The ramped configuration includes a bottom plane 24, a ramp plane 26, and a top plane 28. The bottom plane 24 and the top plane 28 are substantially parallel to one another, and the ramp plane 26 is at an incline relative to each of the bottom plane 24 and the top plane 28. The ramp plane 26 connects the bottom plane 24 to the top plane 28. Each of the plurality of contacts 22 extends along each of the planes 24, 26, 28 to form the ramped configuration and the ramped battery contacts 12. Collectively, the bottom plane 24 and the top plane 28 can be referred to as contact "landing pads" that assist in the connection of the plurality of contacts 22 with external contacts, such as in the connection pad 20.

The ramped battery contacts 12 also include a pad portion 30 in addition to the plurality of contacts 22. The pad portion 30 also extends along each of the planes 24, 26, 28 to form the ramped configuration and the ramped battery contacts 12. The ramp plane 26 is a gradual incline that minimizes wear on the pad portion 30, the plurality of contacts 22, and the battery housing 14. The pad portion 30 includes an electrically neutral material or the like and does not provide a connection to the battery cells. In an exemplary configuration, the plurality of contacts 22 are slightly recessed from the pad portion 30 to prevent unintentional contact with one of the plurality of contacts 22. The plurality of contacts 22 can include any conducting material, such as gold-plated and the like. For example, the plurality of contacts 22 can be nickel plated to prevent galvanic corrosion between dissimilar metals such as in the connection pad 20.

For illustration purposes, the connection pad 20 is shown apart from a terminal or other corresponding device. Those of ordinary skill in the art will recognize the connection pad 20 is disposed, attached, and/or connected within the terminal or other corresponding device. The connection pad 20 includes a pogo pin design with a plurality of pogo pin contacts 32 slidingly disposed within a housing 34. The pogo pin battery contacts 32 provide a robust, high cycle, and small interconnect design to support repeated mechanical stress exerted on the contact 32 during usage. The pogo pin contacts 32 are a highly durable point-to-point contact when assembled. Each of the pogo pin contacts 32 includes a pin that each has a compressible end portion that is biased outwardly by a spring disposed within the housing 34 when detached from the ramped battery contacts 12. When the ramped battery contacts 12 are attached to the connection pad 20, the ramped battery contacts 12 on the battery pack 10 mate with the pogo pin contacts 32 compressing the associated springs thereby making a robust contact between the pogo pin contacts 32 and the ramped battery contacts 12. In an exemplary embodiment, the connection pad 20 is located on or in a terminal device including any of mobile phones, laptop computers, bar code scanning devices, RFID devices, smart phones and other PDA devices, two-way radios and pagers, WLAN devices, or any other device that utilizes a battery, such as the battery pack 10, that detaches from the terminal device for charging. The pogo pin contacts 32 prevent disconnections in a rugged environment as is typically seen by the aforementioned devices.

FIG. 2 illustrates the battery pack 10 attached to the connection pad 20 according to an exemplary embodiment of the present invention. As described above, FIGS. 1 and 2 collectively illustrate a first mode of connection of the battery pack 10 to the connection pad 20. Specifically, this first mode of connection includes connecting the pogo pin contacts 32 on the connection pad 20 with the plurality of contacts 22 on the ramped battery contacts 12. In the first mode of connection, the terminal device with the connection pad 20 and the pogo pin contacts 32 mates with the battery pack 10 along an axis 36. Specifically, the connection in the first mode includes the connection pad 20 traveling perpendicular to the planes 24, 26, 28 in the ramped configuration. The landing pad configuration of the planes 24, 28 enables different heights in the ramped battery contacts 12 to support different compression actions necessary for proper electrical connections between the pogo pin contacts 32 and the plurality of contacts 22. In an exemplary embodiment, the connection pad 20 is disposed on a terminal device and the battery pack 10 engages the terminal device at a 90 degree angle, i.e. slides into the terminal device.

Figure 4:
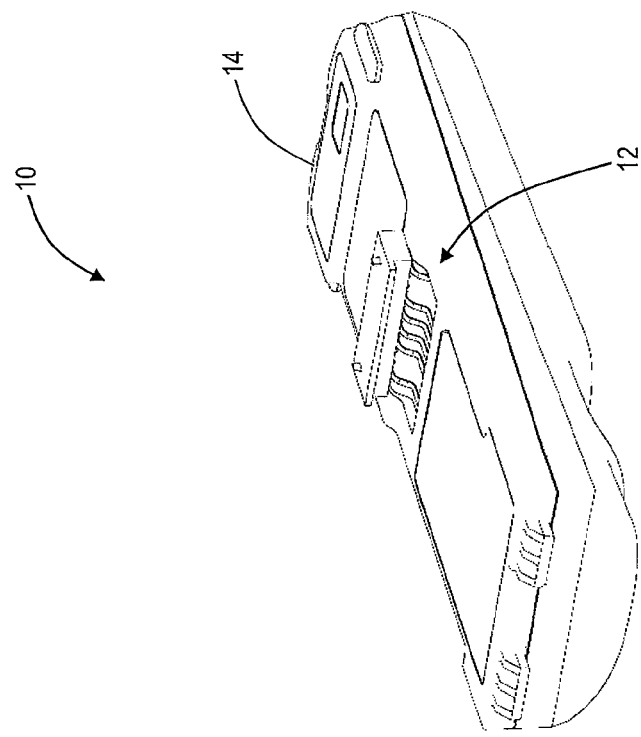
FIG. 4 illustrates the battery pack attached to the second connection pad of FIG. 3 according to an exemplary embodiment of the present invention.
Figure 3:
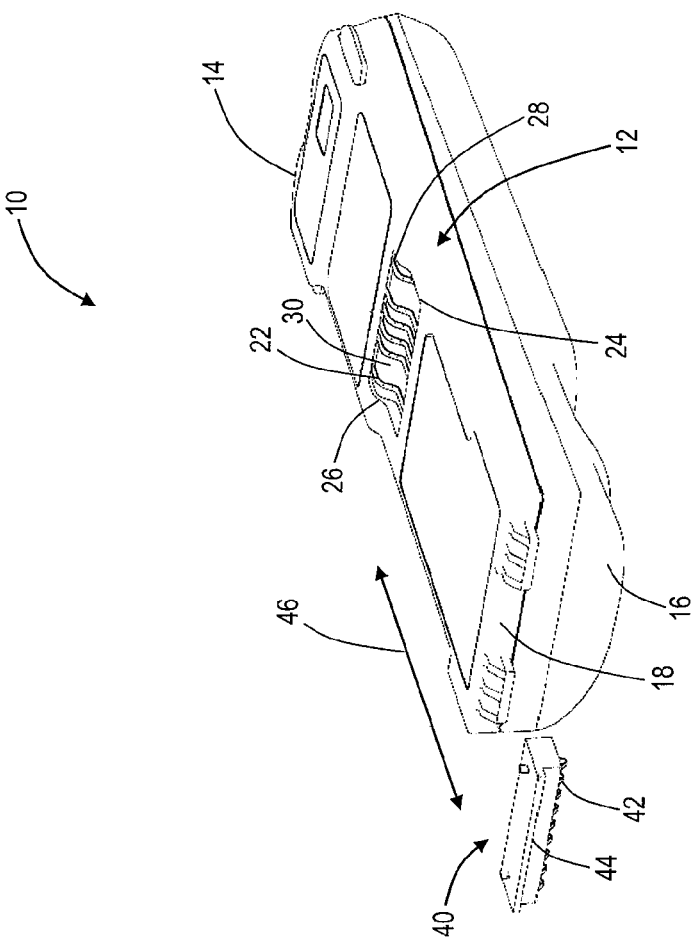
FIG. 3 illustrates the battery pack detached from a second connection pad in a second mode of connection according to an exemplary embodiment of the present invention.

Referring to FIGS. 3 and 4, the battery pack 10 with the ramped battery contacts 12 is illustrated in a second mode of connection according to an exemplary embodiment of the present invention. FIG. 3 illustrates the battery pack 10 detached from a second connection pad 40 in the second mode of connection according to an exemplary embodiment of the present invention. FIG. 4 illustrates the battery pack attached to the second connection pad of FIG. 3 according to an exemplary embodiment of the present invention. For illustration purposes, the second connection pad 40 is shown apart from a recharging station or other corresponding device. Those of ordinary skill in the art will recognize the connection pad 40 is disposed, attached, and/or connected within the recharging station or other corresponding device. The connection pad 40 includes a leaf spring design where a plurality of leaf spring contacts 42 curve in a bow shape and the leaf spring contacts 42 are attached and/or connected to a housing 44. In an exemplary embodiment, the connection pad 40 is located on or in a recharging station, charger, or any other device that can engage the battery packs 10 through a swiping action.

As described above, FIGS. 3 and 4 collectively illustrate a first mode of connection of the battery pack 10 to the connection pad 40. Specifically, this second mode of connection includes connecting the leaf spring contacts 42 on the connection pad 40 with the plurality of contacts 22 on the ramped battery contacts 12. In the second mode of connection, the recharging station with the connection pad 40 and the leaf spring contacts 42 mates with the battery pack 10 along an axis 46. Specifically, the connection in the second mode includes the connection pad 40 traveling parallel to the planes 24, 26, 28 in the ramped configuration. The configuration of the planes 24, 28 enables the ramped battery contacts 12 to support a swiping motion between the recharging station with the connection pad 40 and the battery pack 10. Specifically, the battery pack 10 is swiped onto the connection pad 40 along the axis 46 such that the leaf spring contacts 42 connect to the plurality of contacts 22. Additionally, this swiping action cleans the plurality of contacts 22 while avoiding a build up of residue from the battery pack's 10 housing 14. The leaf spring contacts 42 initially engage the plurality of contacts 22 at the bottom plane 24 and move along the ramp plane 26 to a stationary position on the top plane 28. The ramp plane 26 allows the leaf spring contacts 42 to engage the plurality of contacts 22 without damage to either one and with minimal wear on both. Additionally, the swiping action of the leaf spring contacts 42 makes insertion and removal of the battery pack 10 in the recharging station quicker and easier and can also eliminate the need for latches or levers in the recharging station.

Because the contacts of the battery need to be recessed for safety purposes, the ramped battery contacts 12 engage the leaf spring contacts 42 without dragging them over the battery plastics and label, i.e. on the housing 14. Advantageously, the ramped battery contacts 12 drastically increase the life of the contacts 22, 32, 42 and prevent undesirable damage to the battery 10. By ramping the battery contacts 22, the contact surfaces 42 are brought up past the plastic surface of the battery, so the leaf springs contact 42 only the plurality of contacts 22, e.g. gold-plated surfaces. The contacts 22 ramp gradually to minimize wear and greatly increase the service life of the recharging station. The present invention avoids the requirement to create mutually exclusive contact surfaces on the battery pack 10 to mate with each type of connector, i.e. the pogo pin contacts 32 and the leaf spring contacts 42. A mutually exclusive contact surface design would double the contact parts needed thus increase the cost and complexity of the battery pack 10 as well as reducing the durability of the battery pack 10.

Figure 5:
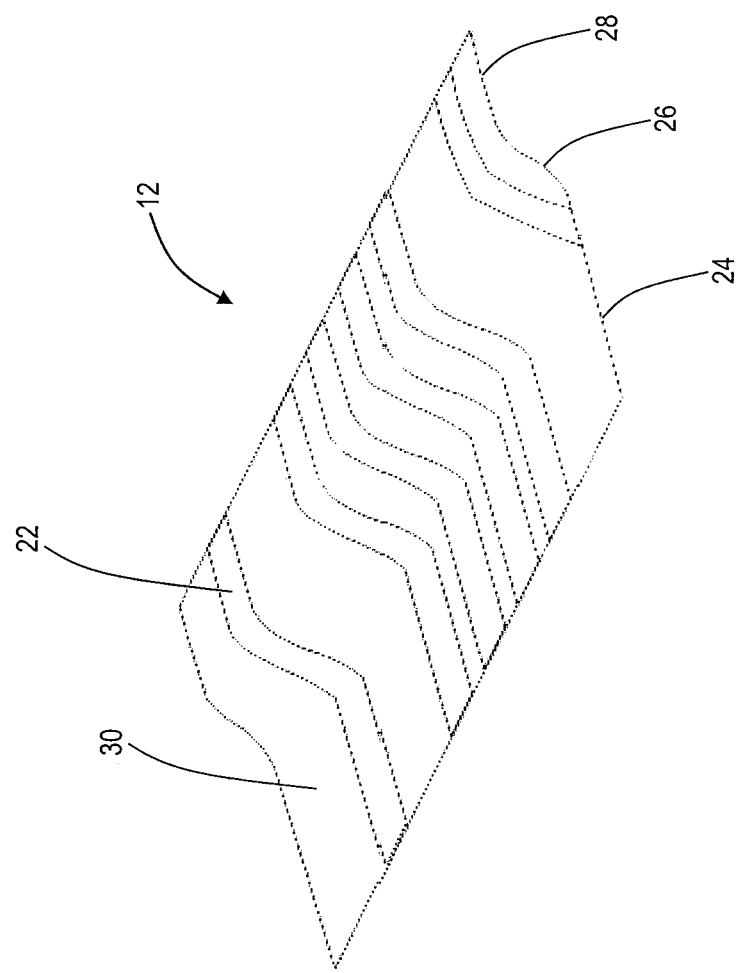
FIG. 5 illustrates ramped battery contacts of the battery pack according to an exemplary embodiment of the present invention.

Referring to FIG. 5, a close-up view is illustrated of the ramped battery contacts 12 according to an exemplary embodiment of the present invention. As described herein, the ramped battery contacts 12 include the bottom plane 24, the ramp plane 26, and the top plane 28. The surface of the ramped battery contacts 12 is formed by the pad portion 30 and the plurality of contacts 22 either at the surface of the pad portion 30 or recessed for safety. The plurality of contacts 22 form an electrical connection to the battery cell disposed in the battery pack 10. There can be any number of contacts, such as six in the illustrated example. Both the pad portion 30 and the plurality of contacts 22 align to the planes 24, 26, 28. The bottom plane 24 provides a connection point for the pogo pin contacts 32, and the top plane 26 provides a connection point for the leaf spring contacts 42. The ramp plane 26 provides differing compression heights for the pogo pin contacts 32, and a ramp to guide the leaf spring contacts 42 in place on the top plane 28. The ramp plane 26 includes a gradual incline for supporting both the pogo pin contacts 32 and the leaf spring contacts 42. In an exemplary embodiment, the ramp plane 26 can be anywhere from approximately 10 degrees inclined to 60 degrees inclined, and the bottom plane 24 and the top plane 26 are substantially parallel to one another.

Figure 6:
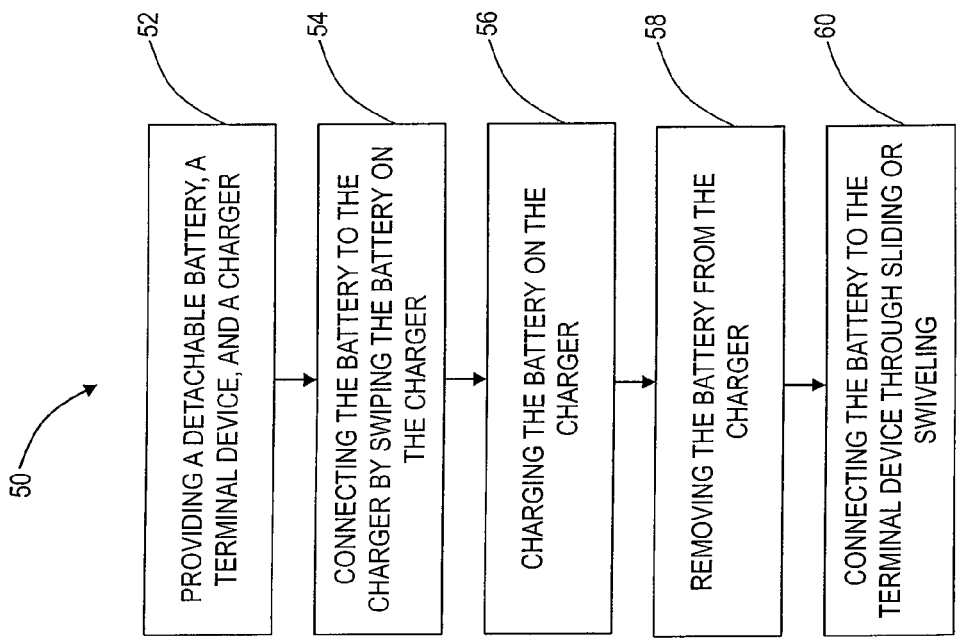
FIG. 6 illustrates a flowchart of a process for using a detachable battery pack in two different connection modes according to an exemplary embodiment of the present invention.

FIG. 6 illustrates a flowchart of a process 50 for using a detachable battery pack in two different connection modes according to an exemplary embodiment of the present invention. As described herein, the present invention provides the detachable battery pack that can be used in a terminal device in one connection mode and in a charger in another connection mode thus allowing for different connections for the different applications. The process 50 starts with providing a detachable battery, a terminal device utilizing the detachable battery, and a charger to recharge the detachable battery (step 52). As described herein, the detachable battery includes ramped electrical contacts supporting the differing connection modes. The detachable battery is connected to the charger by swiping the battery on the charger (step 54). The charger can include leaf spring type contacts that engage the ramped electrical contacts on the battery. The battery is charged by the charger (step 56). The detachable battery is removed from the charger (step 58). Note, the swiping action and corresponding removing action is easy and quick due to the leaf spring type contacts and the ramped electrical contacts.

The detachable battery is connected to a terminal device by sliding, swiveling, snapping, or the like battery with the device (step 60). The sliding, swiveling, snapping, etc. is performed by mating pogo pin contacts on the terminal device with the ramped electrical contacts. The ramp provides a landing pad that provides different compression to different pins due to the ramping height. The pogo pin contacts provide a more durable and reliable connection between the battery and the charger relative to the leaf spring contacts.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A system supporting multiple battery connection modes, comprising:
    a battery comprising battery contacts, wherein the battery contacts comprise a ramped configuration of a plurality of contacts and a contact pad, wherein the plurality of contacts and the contact pad extend along a ramp plane such that the plurality of contacts are disposed on a recessed portion of the contact pad;
    a first device comprising pogo pin contacts; and
    a second device comprising leaf spring contacts;
    wherein the ramped configuration provides different connection modes comprising a first connection mode between the battery and the first device and a second connection mode between the battery and the second device and further wherein in the first connection mode the first device engages the plurality of contacts from a substantially perpendicular direction relative to the ramped configuration, and in the second connection mode the second device engages the plurality of contacts from a substantially parallel direction relative to the ramped configuration.

2. The system of claim 1, wherein the ramped configuration comprises a bottom plane, a top plane, and the ramp plane interconnecting the bottom plane and the top plane, wherein the ramp plane is at an angle relative to the bottom plane and the top plane, and wherein the bottom plane and the top plane are substantially parallel.

3. The system of claim 1, wherein the plurality of contacts and the contact pad extend along each of the bottom plane, the top plane, and the ramp plane.

4. The system of claim 2, wherein the plurality of contacts is slightly recessed relative to the contact pad.

5. The system of claim 2, wherein the ramped configuration connects to a device with the pogo pin contacts in a first mode and connection to a device with the leaf spring contacts in a second mode.

6. The system of claim 5, wherein the device with pogo pin contacts comprises a terminal device configured to attach and detach with the battery, and the device with leaf spring contacts comprises a charger configured to attach and detach with the battery.

7. The system of claim 5, wherein the ramped configuration of the battery contacts is adapted to engage with the first device comprising the pogo pin contacts by sliding the pogo pin contacts into the ramped configuration substantially perpendicular to the bottom plane, the top plane, and the ramp plane such that the bottom plane, the top plane, and the ramp plane form a landing pad providing different compression actions to the pogo pin contacts; and
    wherein the ramped configuration of the battery contacts is adapted to engage with the second device comprising the leaf spring contacts the second device comprising the leaf spring contacts engages with the ramped configuration of the battery contacts by swiping the leaf spring contacts into the bottom plane, the top plane, and the ramp plane substantially parallel to the bottom plane, the top plane, and the ramp plane such that the leaf spring contacts first engage from the bottom plane to the ramp plane to the top plane.

8. The system of claim 7, wherein the plurality of contacts is slightly recessed relative to the contact pad, and wherein the leaf spring contacts engage the bottom plane, the top plane, and the ramp plane without damaging the housing.

* * * * *